June 28, 1949.　　　M. GRAVES ET AL　　　2,474,418
SHOVEL ATTACHMENT FOR SELF-LOADING TRUCKS
Filed Oct. 29, 1946
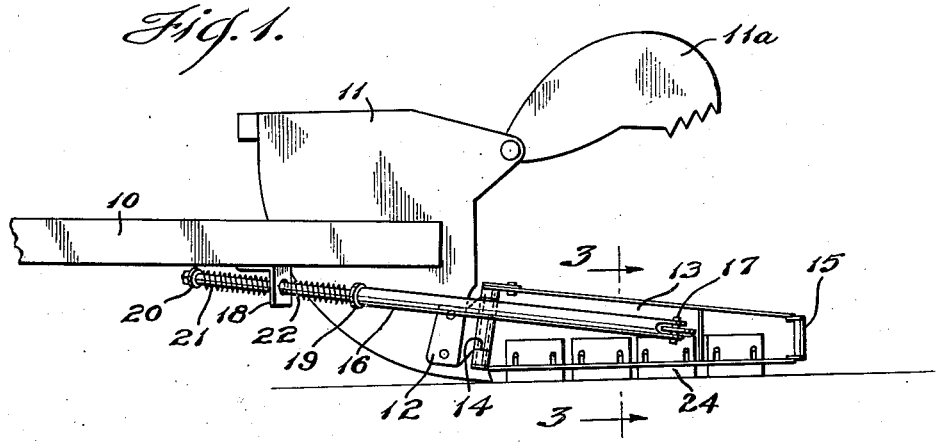
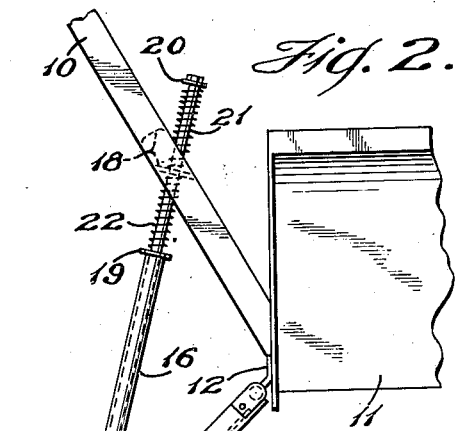
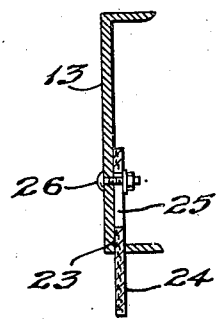
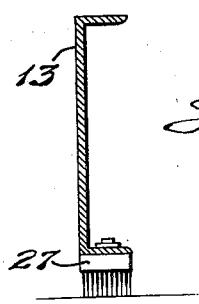
INVENTOR
MICHAEL GRAVES, ANATOLY LANKOVSKI
By Hazard and Miller
ATTORNEY Patented June 28, 1949

2,474,418

UNITED STATES PATENT OFFICE 2,474,418

SHOVEL ATTACHMENT FOR SELF-LOADING TRUCKS

Michael Graves and Anatoly Lankovski, Los Angeles, Calif., assignors to Matthew B. Butler, Chicago, Ill.

Application October 29, 1946, Serial No. 706,342

2 Claims. (Cl. 214—78)

This invention relates to a shovel or a scoop attachment for self-loading trucks and the like and may be regarded as an improvement or further development of the construction of the self-loading truck disclosed in our co-pending application Serial No. 637,872, filed December 29, 1945, now Patent No. 2,457,039 granted December 21, 1948.

In the above mentioned application there is disclosed a self-loading truck consisting of a truck having swingable arms mounted thereon that extend forwardly from adjacent the center of the truck and which carry at their forward ends a scoop or shovel that may be caused to scoop or scrape the surface forwardly of the truck. When the scoop or shovel has been loaded the arms are caused to swing upwardly and rearwardly to carry the scoop or shovel over the cab of the truck and to deposit the load in the truck body. When the load has been deposited in the truck body the arms are swung downwardly and forwardly to return the scoop or shovel to a loading position forwardly of the truck chassis.

We have ascertained that a self-loading truck of this character may be advantageously used for cleaning streets particularly when the scoop or shovel is provided with an attachment herein disclosed which will effectively scrape or sweep the street up to the edge of the curb.

It is therefore an object of the present invention to provide an attachment for the scoop or shovel of a self-loading truck in the form of an arm pivotally mounted upon either or both sides of the scoop or shovel and which is yieldably but normally held in a position extending outwardly and forwardly of the scoop or shovel so as to be engageable with the curb. In this manner, as the truck progresses along the street with the scoop or shovel in its scraping or loading position, the arm and its scrapers or brushes may be caused to engage the curb and to sweep material encountered thereby in the gutter into the scoop or shovel. Inasmuch as the arm is yieldably held in this position, the truck, as it progresses, may vary somewhat in its distance from the curb but the arm will automatically accommodate itself to these variations.

It is a further object of the invention to provide an attachment as above describe wherein the outer end of the arm is equipped with a roller engageable with the curb and which extends above the normal height of the curb. In this manner, when the attachment passes the entrance to a storm drain, the arm will not swing into the drain and become damaged on encountering the walls thereof. Instead the roller will traverse the edge of the cover of the sewer and thus maintain the arm in proper position.

With the foregoing and other objects in view, which will be made manifest in the following detailed description and specifically pointed out in the appended claims, reference is had to the accompanying drawings for an illustrative embodiment of the invention, wherein:

Figure 1 is a view in side elevation of a scoop or shovel of a self-loading truck illustrating the attachment embodying the present invention as having been applied thereto;

Fig. 2 is a top plan view of one side of the scoop or shovel and illustrating the attachment thereon;

Fig. 3 is a sectional view taken substantially upon the line 3—3 upon Fig. 1; and Fig. 4 is a sectional view similar to Fig. 3 but illustrating a modified form of construction.

Referring to the accompanying drawings wherein similar reference characters designate similar parts throughout, 10 indicates one of a pair of arms that are swingably mounted on a truck adjacent the center thereof and which are adapted to assume approximately horizontal positions extending forwardly to support a scoop or shovel 11 between their forward ends. As disclosed in our copending application, above mentioned, when the scoop or shovel 11 has been loaded the arms 10 serve to swing the scoop or shovel upwardly and rearwardly over the top of the cab of the truck and into an upwardly and rearwardly inclined position in which position the contents of the shovel spill from the top or rear side of the scoop or shovel into the body of the truck. When the load in the scoop or shovel has been thus emptied into the body, the scoop is returned to the position shown in Fig. 1 and as the truck progresses forwardly the scoop may scrape up an additional load. The material to be scooped up usually collects in advance of the scoop and is moved therein by the closing of a hydraulically operable jaw 11a. The attachment embodying the present invention consists of a bracket 12 rigidly attached to a side of the scoop having an arm 13 hingedly connected thereto as at 14. This arm is adapted to assume a normal position extending laterally and forwardly beyond the forward edge of the scoop. The extreme end of the arm is equipped with a vertically extending roller 15 which is of a height to extend above the normal height of a curb of a street.

A brace 16 is pivotally connected to the arm 13 as at 17. This brace slidably extends through the aperture in a bracket 18 that is secured to the underside of the arm 10. On opposite sides of the bracket 18 the brace has spring seats 19 and 20 for compression springs 21 and 22 that are compressed between the spring seats and the opposite sides of the bracket 18. The compression springs cause the brace 16 to yieldably hold the arm 13 in its normal position extending laterally and forwardly from the side of the scoop or shovel 11.

The arm 13 is preferably channel-shaped in cross section for stiffness purposes, having top and bottom flanges as indicated in Fig. 3. The bottom flange is preferably apertured or slotted as indicated at 23 to receive sweeping or scraping elements 24. These sweeping or scraping elements may be in the nature of sections of heavy rubber belting that have vertical slots 25 formed therein through which mounting bolts 26 extend, thus providing for vertical adjustment of each scraping or sweeping element. In lieu of sections of rubber belting, metal plates may be employed or, as illustrated in Fig. 4, heavy brushes 27 may be mounted on the bottom flange of the arm.

By means of this construction it will be appreciated that the truck may be driven along a street adjacent the curb thereof while the scoop or shovel 11 is in its lower or scraping position. The arm 13 is designed to bridge the space between the side of the scoop and the curb and the roller 15 is intended to roll against the face of the curb. As the driving of the truck continues the spacing of the truck and consequently of the scoop or shovel 11 from the curb may vary from a normal position wherein spring 21 is abnormally compressed. Thus if the truck and shovel move away from the curb, the compression of spring 21 is relieved by drawing the arm 13 rearwardly with the curb. Conversely, if the truck and shovel move closer to the curb the arm may be caused to swing more forwardly by compressing spring 21 to a greater extent. When the arm passes across a sewer entrance the arm will not swing into the entrance and thus become damaged due to the fact that the roller 15 is sufficiently high to roll on the edge of the cover over the entrance.

It will be appreciated that the arm 13 may be mounted on either side of the scoop or shovel or, if desired, arms thus constructed may be mounted on both sides.

As the truck progresses along the street the arm serves to sweep material in the gutter adjacent the curb into the scoop or shovel which, in turn, elevates the material and deposits it in the truck body. During such elevated movements the two springs 21 and 22 serve to cause the brace 16 to maintain the arm in approximately its normal position.

Various changes may be made in the details of construction without departing from the spirit and scope of the invention as defined by the appended claims.

We claim:

1. A scoop for a self-loading truck or the like having at one side thereof means extending outwardly and forwardly thereof adapted to direct material into the entrance of the scoop as the scoop is moved upwardly over the ground, said means being pivotally secured to the scoop for swinging movement relatively thereto, a bar pivotally secured to said means and extending rearwardly therefrom and spring means effective on the bar serving to urge said means into a predetermined position with relation to the scoop by permitting it to be swung in either direction from said position.

2. A scoop for a self-loading truck or the like having at one side thereof means extending outwardly and forwardly thereof adapted to direct material into the entrance of the scoop as the scoop is moved upwardly over the ground, said means being pivotally secured to the scoop for swinging movement relatively thereto, a bar pivotally secured to said means and extending rearwardly therefrom, and means through which the bar slidably extends and compression springs surrounding the bar engaging the last mentioned means and serving to urge the bar and the means to which the bar is connected into a predetermined position by permitting it to be moved in either direction from said position.

MICHAEL GRAVES.
ANATOLY LANKOVSKI.

REFERENCES CITED

The following references are of record in the file of this patent:

UNITED STATES PATENTS

| Number | Name | Date |
|---|---|---|
| 1,143,052 | Kerr | June 15, 1915 |
| 1,464,672 | Whittemore | Aug. 14, 1923 |
| 1,565,829 | Thibaudeau | Dec. 15, 1925 |
| 1,889,667 | Klauer | Nov. 29, 1932 |
| 2,101,769 | Westmoreland | Dec. 7, 1937 |
| 2,345,612 | Lewis | Apr. 4, 1944 |